R. HUFF.
MOTOR VEHICLE.
APPLICATION FILED OCT. 25, 1912.
1,101,850.
Patented June 30, 1914.
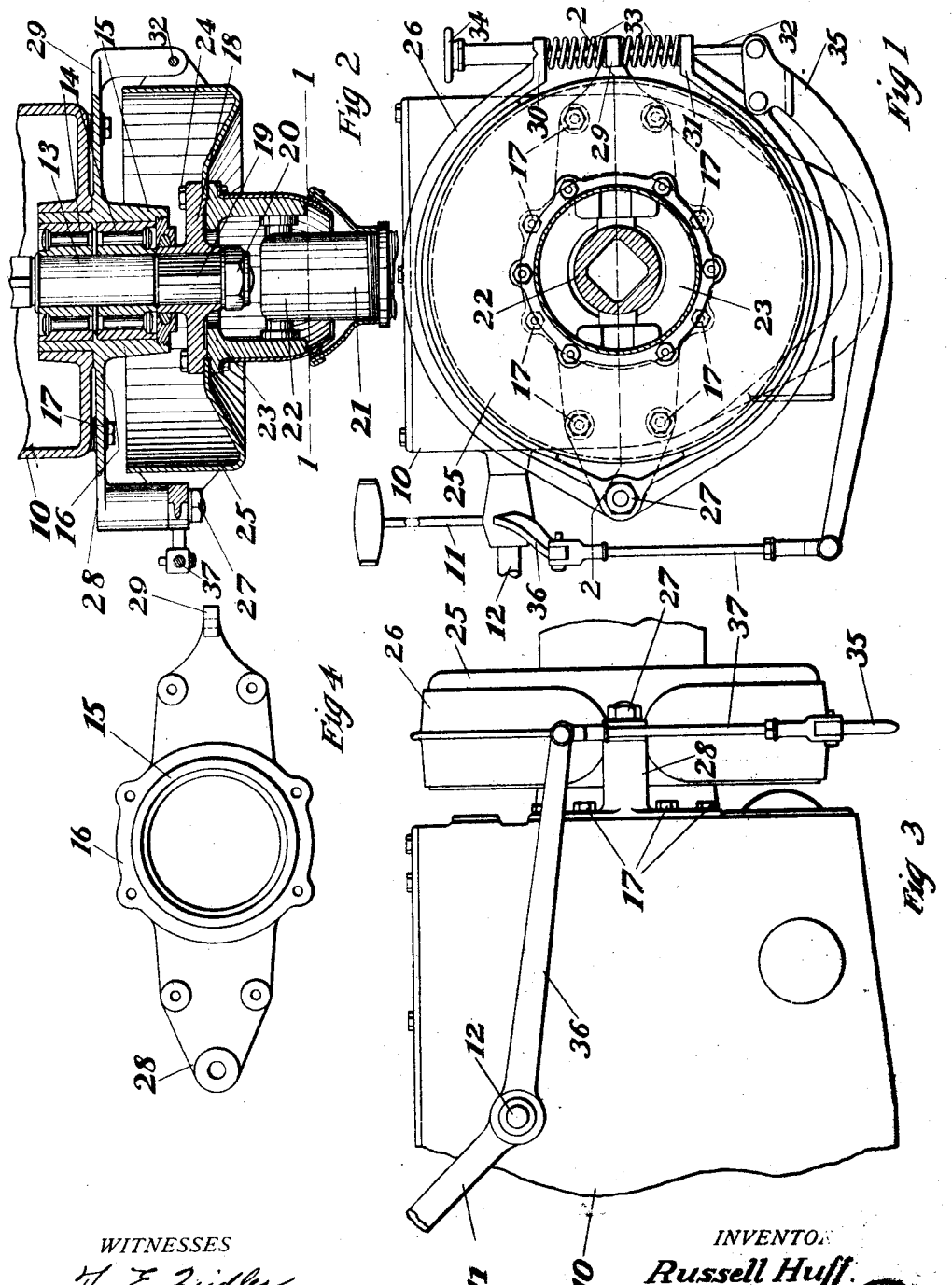
WITNESSES
Thos. E. Ziedler
Milo L. Bailey
INVENTOR
Russell Huff.
by Wilton Pitts
Attorney

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,101,850.  Specification of Letters Patent.  Patented June 30, 1914.

Application filed October 25, 1912. Serial No. 727,798.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This invention relates to motor vehicles, and particularly to the transmission mechanism thereof.

One of the objects of the invention is to support one of the transmission shafts of the vehicle and one of the vehicle's brakes by a simple supporting element that may be either drop forged or cast.

Another object of the invention is to have a brake operating on one of the transmission shafts of the vehicle and connected with a pedal operated lever by a minimum number of links and other connecting devices.

Another object of the invention is to connect two sections of the transmission shaft of the vehicle by a universal joint and mount a brake drum on these parts by a simple and secure construction.

Other objects of the invention will appear from the following description, taken in connection with the drawings, which form a part of this specification, and in which, Figure 1 is an end elevation of the gear casing of a motor vehicle together with the brake and other parts comprising this invention, the view being approximately on the line 1—1 of Fig. 2; Fig. 2 is a sectional view on the line 2—2 of Fig. 1; Fig. 3 is a side elevation of the parts shown in Fig. 1; and Fig. 4 is a detail view of the brake and bearing supporting member.

In the drawings, 10 represents the gear box or casing of a motor vehicle, which casing is suitably mounted usually at the rear end of the motor. This brings the casing approximately under the driver's seat, so that the pedals for operating the gears and other mechanism may be mounted directly on this gear casing, thus bringing these pedals to a point where they can be conveniently operated by the driver. Such a brake pedal is shown at 11, in Figs. 1 and 3, this pedal being pivoted at 12 directly to a suitable boss on the gear casing.

One of the transmission or drive shafts of the gear casing is shown at 13 as extending through the rear end of the casing, and it is mounted in two sets of roller bearings 14. These bearings are supported in the enlarged part 15 of a supporting member 16, which member is shown as bolted to the rear end of the gear casing 10 by a series of eight bolts marked 17. The projecting end of the shaft 13 is provided with a flange 18, which may either be formed integrally with it or keyed to it as it is shown in the drawings, the end of the shaft being square, as at 19, and the flange 18 being secured thereon, as by nut 20. The driven section of the transmission shaft is shown at 21 as connected to the driving section of the shaft by a universal joint 22, one of the members of which has a flange 23, which is bolted to the flange 18, as shown particularly in Fig. 2.

Secured between the flanges 18 and 23 by the bolts 24, is a brake drum 25 which is adapted to be operated upon by a brake band 26, which may be in the form of a split ring or composed of a pair of shoes pivoted together, as at 27. This pivotal point 27 constitutes the anchor for the brake band, and it is secured to a radial arm 28 formed as an integral part of the supporting member 16. An oppositely extending radial arm, also integral with the supporting member 16, has an offset lug 29, which extends between the free ends 30 and 31 of the brake band 26. A link 32 is shown as passing vertically through the ends 30 and 31 of the brake band and through a hole in the lug 29 above referred to, and springs 33 surround this link and tend to separate the brake shoes from the brake drum. A hand adjusting nut 34 is threaded onto the upper end of the link 32 for adjustably securing the link to the brake band end 30. The other end of the link 32 is pivotally connected to the other shoe of the brake band by a lever 35, which extends from that side of the brake entirely across to the other side thereof, thus giving a long leverage and bringing the free end of the lever 35 to a point where it can be conveniently connected to the arm 36 of the pedal lever 11. This connection is in the form of a simple link 37, as shown particularly in Figs. 1 and 3.

Various modifications of the invention may be made without departing from the spirit thereof, and the claims are intended to, and do, include such modified forms.

Having thus described my invention, what I claim and desire to secure by Letters Patent, is,

1. In a motor vehicle transmission mechanism the combination with a gear casing having a drive shaft extending through the end thereof, a brake drum on said shaft, and a brake operating on said drum, of a supporting member secured to said casing having bearings for said shaft and having means for supporting said brake.

2. The combination with a gear casing having a shaft therein, of a bearing support having a bearing for said shaft and having means thereon for supporting a brake, and a brake on said supporting means.

3. The combination with a casing having a shaft extending through the end thereof, and a brake drum secured to said shaft, of a bearing support having bearings for said shaft and having an integral supporting arm, and a brake secured to said arm and operating on said brake drum.

4. The combination with a gear casing having a drive shaft extending through the end thereof, and a brake drum mounted on said shaft, of a bearing support secured to said casing and having bearings for said shaft, said bearing support also having a brake supporting member, a brake band supported on said supporting member and arranged to operatively engage said brake drum, and means for contracting and expanding said brake band.

5. The combination with a gear casing having a driven shaft extending through the end thereof, and a brake drum mounted on said shaft, of a bearing support secured to said casing and having bearings for said shaft, said bearing support also having a brake supporting member, brake shoes supported on said supporting member and arranged to operatively engage said brake drum, and means mounted on the gear casing for contracting and expanding said brake shoes.

6. The combination with a brake drum and a brake support, of a brake band surrounding said drum, anchor means on said support for said brake band at one side of said drum, a link connected to one of the free ends of said band at the other side of said drum, a lever connecting said link and the other end of said band, said lever extending from the link side of said brake to its anchored side, and means for operating said lever to apply the brake.

7. The combination with a brake drum, of a brake band pivotally supported at one side of said drum and adapted to engage therewith, means arranged at the other side of said brake drum for contracting and expanding the free ends of said brake band, and a lever extending from one side of the brake drum to the other for operating the means for contracting and expanding said brake band.

8. In a motor vehicle transmission mechanism, the combination with a driving shaft having a flange, a driven shaft, and a universal coupling connecting said driven shaft to the flange of said driving shaft, of a brake drum connected to said driven shaft between the flange thereof and said universal coupling.

9. In a motor vehicle transmission mechanism, the combination with a shaft having a brake drum thereon, of a supporting member comprising a bearing portion for said shaft and a pair of oppositely extending arms, a brake band anchored to one of said arms and extending around said drum with its ends adjacent and above and below the other said arm, a link passing through the end of the latter said arm and through the ends of said brake band, a hand adjusting nut for adjustably connecting one end of said link with one end of said band, springs surrounding said link between the latter said arm and the ends of said band, and an operating lever pivotally connected to said link and to said band for actuating the brake.

In testimony whereof I affix my signature in the presence of two witnesses.

RUSSELL HUFF.

Witnesses:
 MILO L. BAILEY,
 THEO. E. ZEIDLER.